Patented June 24, 1930

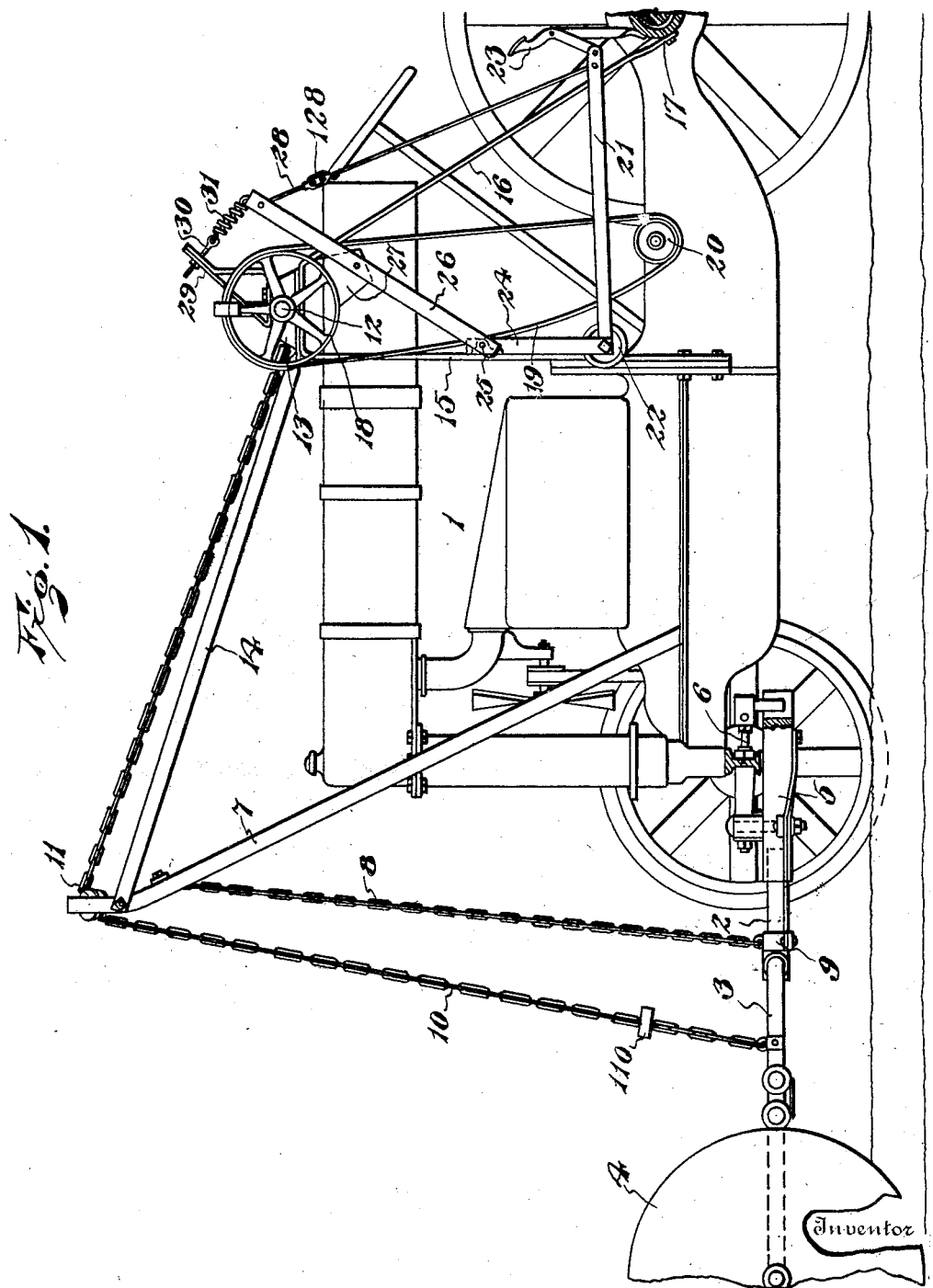

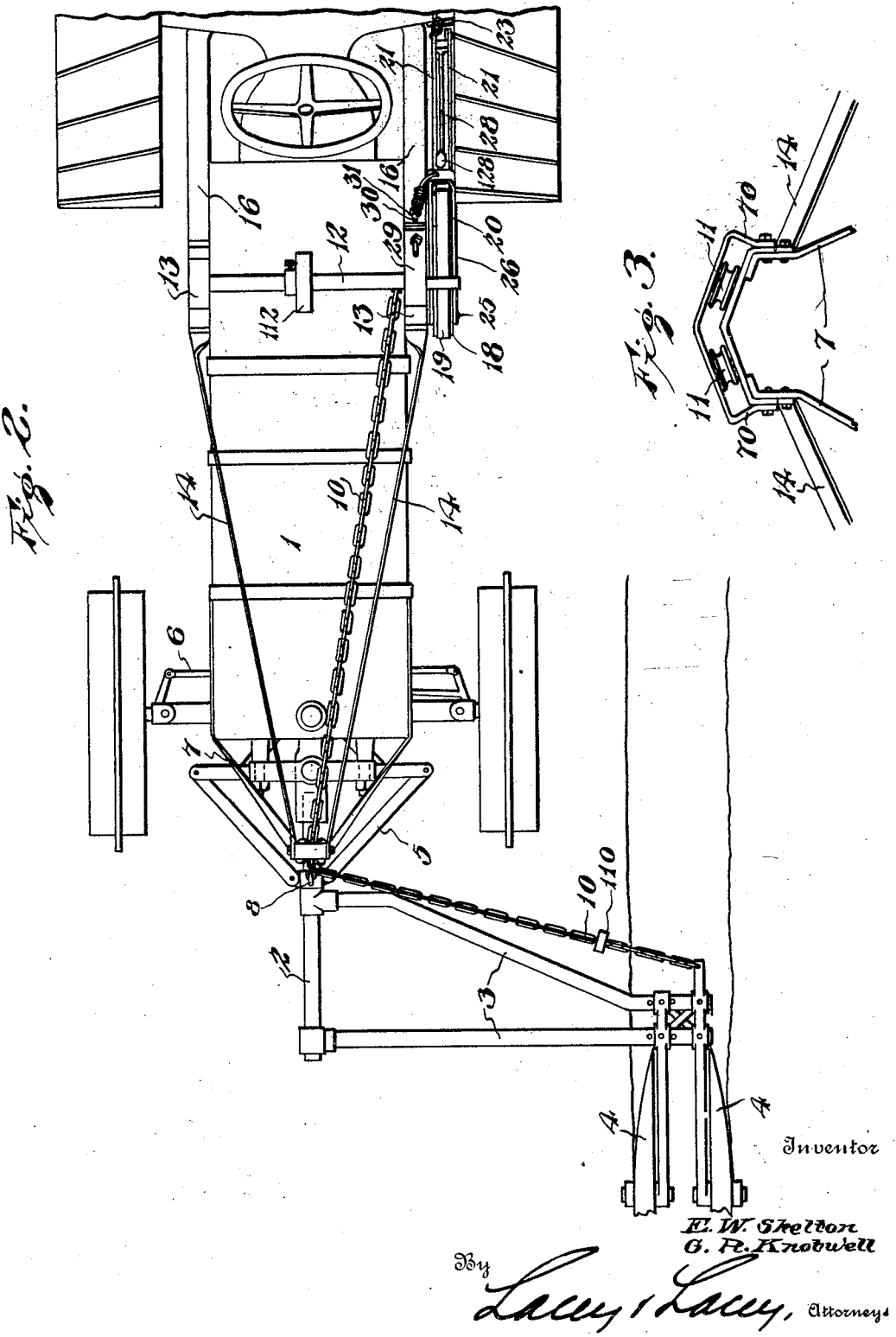

1,768,218

UNITED STATES PATENT OFFICE

EARL W. SKELTON AND GLENN R. KNOTWELL, OF WAUNETA, NEBRASKA

TRACTOR GUIDE

Application filed April 19, 1928. Serial No. 271,333.

Our present invention relates to tractor guides of that class in which a pair of guide rollers or disks is supported at the front of a tractor and connected with the steering gear thereof and arranged to run in a furrow so that a second furrow being formed by plows or other implements drawn by the tractor will be parallel with the previously formed furrow. The present invention relates particularly to the means for lifting the guiding rollers or disks at the end of a furrow or when, for any reason, the tractor is to be turned to one side or is to be reversed in its travel, and has for its object the provision of simple and efficient means whereby the power of the tractor engine will be utilized to effect the lifting of the guiding disks or rollers. The invention is illustrated in the accompanying drawings and consists in certain novel features which will be particularly pointed out in the claim following a detailed description.

In the drawings:

Figure 1 is a side elevation of a tractor and tractor guide showing our present invention applied thereto;

Fig. 2 is a top plan view of the same, and

Fig. 3 is a detail.

In the drawings, the reference numeral 1 indicates a tractor which is shown in a more or less conventional manner and which may be of any known or approved type. Mounted at the front end of the tractor is a rock shaft 2 which extends forwardly from the tractor and carries lateral arms 3 which at their outer free ends support guiding disks 4 adapted to run in a furrow. The rock shaft 2 is connected by elements 5 with the steering gear of the tractor, indicated at 6, whereby any lateral movement of the guiding disks which bear against the walls of the furrow will be transmitted to the steering mechanism and the path of the tractor, consequently, held parallel with the furrow. Mounted upon the tractor frame adjacent the front end thereof in any convenient manner is a mast 7 to which is attached the upper end of a chain 8 which has its lower end attached to one of the bearings 9 for the rock shaft 2 so that the shaft will be firmly supported. A lifting chain or cable 10 is also provided which has one end attached to or connected with the supporting arms 3 adjacent the outer ends thereof and extends to and between guide rollers 11 at the upper end of the mast 7 and then rearwardly over the tractor to be connected to a winding shaft or windlass. As shown in Fig. 3, said rollers are mounted in a yoke 70 secured at the upper end of the mast and lie at an angle of approximately twenty-two degrees, the chain passing through the yoke between the rollers.

In carrying out the present invention, the winding shaft or windlass 12 extends transversely above the tractor adjacent the rear end thereof and is mounted in bearings 13 which are carried by frames arranged at the sides of the tractor, braces 14 extending from said frames to the end of the mast 7 so as to impart rigidity to the mast and aid the same in sustaining the weight of the guiding disks and the parts which carry the same. The supporting frames which have been just mentioned consist each of a forward leg 15 secured rigidly at its lower end to the flanges of the crank case and transmission housing of the tractor and a rear leg 16 which may have its lower end rigidly secured in any effective manner to the rear axle housing or other convenient place. Upon one end of the winding shaft 12 is secured a band pulley 18 about which is trained a belt 19 which has its lower portion loosely passed around the power take-off pulley 20 of the tractor. Passing at the sides of the belt above the power take-off pulley 20 are links 21 carrying an idler 22 at their front ends which is disposed in front of the belt, as shown clearly in Fig. 1, the rear ends of these links being attached to a treadle 23 mounted in any convenient manner upon the operator's platform. A hanger 24 is pivoted to the front ends of the links 21 and rises therefrom to be pivotally mounted upon a pin or bolt 25 which may be secured in any desired manner to the adjacent leg 15 of the supporting frame, and extending rearwardly and upwardly from said bolt is a yoke or link 26 which carries between its ends a brake shoe 27 adapted to bear against the pulley 18, as will be understood upon reference to Fig. 1. To the rear extremity of the yoke 26 is attached a link or connecting rod 28 which extends to the links 21 and is pivotally attached thereto adjacent the pedal 23. A bracket 29 is secured upon the bearing 13 immediately at the side of the pulley 18 and in the extremity of said bracket is mounted an adjustable eye bolt 30, and a retractile spring 31 is attached to and extends between said bolt and the rear free end of the yoke 26, as shown and as will be understood. The rod 28 is preferably extensible, as by a turnbuckle 128.

Normally the brake shoe 27 is held against the pulley 18 by the spring 31 and the idler 22 is out of contact with the belt 19 so that the pulley will be held at rest and the guiding disks will be permitted to remain in the furrow. If it be desired to raise the guiding disks, pressure is applied to the pedal 23 by the operator so that the idler 22 will be drawn against the belt 19 and the latter tightened so that the motion of the take-off pulley 20 will be transmitted to the pulley 18 on the winding shaft. Simultaneously with this shifting of the idler 22, the yoke 26 will be swung downwardly by reason of its connection with the links 21 through the connecting rod 28 and the brake shoe will be thus withdrawn from the pulley 18. Consequently, the winding shaft will be rotated to wind the cable or chain 10 and the guiding disks will be swung upwardly. When the guiding disks have been raised to the desired extent, the pressure upon the pedal 23 is released and the spring 31 will then at once retract and draw the brake shoe against the pulley 18 so as to hold the parts against movement. When it is desired to again lower the guiding disks, a slight pressure upon the pedal will release the brake shoe from the pulley 18 without drawing the idler 22 against the belt 19 and, consequently, the cable 10 will be permitted to unwind. With slight practice, the operator will be enabled to apply sufficient pressure to the pulley 18 to prevent too rapid descent of the guiding disks while at the same time permitting the lifting cable to unwind.

The hoisting chain 10 is fastened to the winding shaft near the bearing for the pulley end of the shaft, and at about the middle of the shaft a stop collar 112 is secured thereon. The chain winds from the end of the shaft to the collar and then reverses, making a larger roll and increasing the speed of the rising guiding disks so that their momentum will carry them beyond the dead center.

A stop block 110 is secured upon the chain 10 a short distance from the lower outer end thereof to impinge against the rollers 11 and thereby limit the winding travel of the chain. The guiding disks and their supporting frame, consequently, cannot be raised to and held in a vertical position in which position they will not start to descend until some positive actuating impulse is applied.

The apparatus is very simple and may be readily applied to any existing tractor without great cost.

Having thus described the invention, we claim:

An attachment for a tractor having a power take-off pulley and equipped with a guide to run in a furrow in advance of the tractor, said attachment comprising supporting frames adapted to be secured upon the tractor in upstanding position at the sides thereof, a winding shaft carried by the upper ends of said frames to extend across the top of the tractor, a flexible connection between said winding shaft and the guide, a pulley on the winding shaft, a pedal mounted adjacent the lower end of one frame, a belt trained around the pulley on the winding shaft and passing loosely about the power take-off pulley of the tractor, a hanger pivotally mounted on the frame, an idler carried by the lower end of said hanger and adapted to bear against the belt for tightening the same about the pulleys, a link connecting said hanger with the pedal, a yoke pivoted upon said frame and extending upwardly past the pulley on the winding shaft, a brake shoe carried by said yoke in position to bear against the periphery of said pulley, a bracket secured adjacent the winding shaft and extending upwardly beyond the pulley thereon, a yieldable connection between said bracket and the upper end of the yoke normally holding the brake shoe against the pulley, and a connecting rod extending between said yoke and the link whereby movement of the pedal to tighten the belt will withdraw the brake shoe from the pulley.

In testimony whereof we affix our signatures.

EARL W. SKELTON. [L. S.]
GLENN R. KNOTWELL. [L. S.]